US005085724A

United States Patent [19]

Focke

[11] Patent Number: 5,085,724

[45] Date of Patent: Feb. 4, 1992

[54] PROCESS AND APPARATUS FOR THE PRODUCTION OF (FILM) PACKS AND (FILM) PACK

[75] Inventor: Heinz Focke, Verden, Fed. Rep. of Germany

[73] Assignee: Focke & Co., (Gmbh & Co.), Verden, Fed. Rep. of Germany

[21] Appl. No.: 517,112

[22] Filed: May 1, 1990

[30] Foreign Application Priority Data

May 10, 1989 [DE] Fed. Rep. of Germany ....... 3915192

[51] Int. Cl.[5] .............................................. B32B 31/18

[52] U.S. Cl. .................................. 156/256; 156/259; 156/267; 156/516; 156/517; 156/521; 156/522; 156/552

[58] Field of Search ............... 156/259, 267, 271, 516, 156/517, 521, 522, 552, 256; 53/412; 206/605, 620, 621, 630

[56] References Cited

U.S. PATENT DOCUMENTS

| | | | |
|---|---|---|---|
| 2,596,179 | 5/1952 | Seymour | 156/267 |
| 3,001,906 | 9/1961 | Capella et al. | 156/259 |
| 3,751,324 | 8/1973 | Enskat | 156/521 |
| 4,032,386 | 6/1977 | Fleet | 156/475 |
| 4,462,851 | 7/1984 | Colgate | 156/212 |
| 4,589,943 | 5/1986 | Kimball et al. | 156/259 |

FOREIGN PATENT DOCUMENTS

| | | |
|---|---|---|
| 2363761 | 6/1975 | Fed. Rep. of Germany . |
| 2702482 | 7/1978 | Fed. Rep. of Germany . |
| 2902315 | 7/1979 | Fed. Rep. of Germany . |
| 89015355 | 5/1989 | Fed. Rep. of Germany . |

*Primary Examiner*—Caleb Weston

*Attorney, Agent, or Firm*—Sughrue, Mion, Zinn, Macpeak & Seas

[57] ABSTRACT

Film packs (51) for receiving folded paper handkerchiefs are equipped with a recloseable opening aid consisting of a tear-open tab (34) or a folding tab and of an adhesive label (40) or adhesive strip (47). For the efficient production and special design of packs (51) of this type, they are fed in double rows (52, 53) and are equipped in pairs with adhesive labels (40) or adhesive strips (47). The production and feed of double labels (55) or double strips (79), which are subsequently severed and folded into an end position during the transport of the packs (51), are especially advantageous. By an appropriate design, particularly dimensioning of the adhesive labels (40) with a connecting piece (42) extending in the region of an end wall (27), the stability and handiness of the packs are improved.

13 Claims, 8 Drawing Sheets

PROCESS AND APPARATUS FOR THE PRODUCTION OF (FILM) PACKS AND (FILM) PACK

BACKGROUND OF THE INVENTION

The invention relates to a process for the production of (film) packs especially for paper handkerchiefs, with an opening aid having an adhesive strip or an adhesive label resting on the outside. The invention relates, furthermore, to an apparatus for carrying out the process and to a specially designed (film) pack produced by the process.

Paper handkerchiefs are conventionally offered in cuboid packs consisting of very thin plastic film. A pack of this kind usually contains ten folded paper handkerchiefs.

Film packs have for some time been equipped with tear-open aids, specifically mainly of the recloseable type. In a film pack of this kind in particularly widespread use, a tear-open tab limited by perforation lines is arranged in the region of a (large-surface) front wall of the pack. This tear-open tab extends in the direction of an (upper, small-surface) end wall. An end region of the tongue-shaped tear-open tab is equipped with an adhesive strip which can be pulled off from the front wall by means of an adhesive-free gripping end, the tear-open tab thereby being taken with it. An (upper) extraction orifice for the paper handkerchiefs is thus exposed.

Other embodiments of such film packs are also known, for example with a recloseable tear-open aid having an adhesive strip and located in the region of one of the elongate side walls of the pack.

SUMMARY OF THE INVENTION

The invention is concerned with the production and design of packs of this type. The object on which the invention is based is to design and produce in a material-saving way adhesive strips or adhesive labels for the tear-open aid of such packs and to attach them efficiently to the pack, so that these can be manufactured cost-effectively.

To achieve this object, the process according to the invention is characterized in that the adhesive strips or adhesive labels are severed from a web of material which is equipped with a one-sided adhesive coating and the width of which corresponds at least to the dimension of two adhesive strips or adhesive labels lying next to one another, and in that packs respectively located opposite one another in pairs in the correct position and conveyed in two tracks are equipped simultaneously with an adhesive strip or adhesive label.

Accordingly, in the process according to the invention, two packs conveyed next to one another are equipped simultaneously with the adhesive strip or adhesive label at the position provided for this purpose, these being severed from a web of material of double width immediately before being attached to the pack.

According to a further feature of the invention, the web of material is equipped continuously at the two edges with a covering strip which forms the adhesive-free gripping end in the region of the adhesive strip or adhesive label. According to the invention, the two covering strips are also produced from a strip of material of double width by severing in the centre.

According to an especially advantageous development of the process according to the invention, by means of appropriate punching cuts, adhesive strips or adhesive labels of double width (double strips or double labels) are severed from the web of material (of double width) and, with the packs conveyed in pairs being in an appropriate relative position, are transferred onto these, namely adhesively bonded onto front walls. The double strips or double labels are thereafter severed in a mid-plane and, during further transport, folded into the end position on the pack, namely as a result of the folding of a strip projection or a label projection round into the plane of the adjacent end wall or side wall.

The apparatus according to the invention for carrying out this process has rolls or reels for the web of material and for the covering strip or material strip and at least one cutting roller matched to the shape and size of the adhesive strips or adhesive labels or of the double strips or double labels. Furthermore, if the packs of the two pack rows are conveyed in a relative position pointing in the same direction, there are devices by which the packs of one pack row are rotated through 180° or 90° (should the tear-open aid be arranged on a side wall), so that the packs of the two pack rows have their end walls or side walls facing one another.

A pack produced by the process according to the invention is so designed, in the region of the opening aid, that an adhesive label extending approximately over the entire width of the front wall is continued by means of a label projection (leg) into the plane of the end wall and is connected to this by adhesive bonding in a region corresponding approximately to half the surface of the end wall. This design and arrangement of the adhesive label ensures an increased stability of the pack in the region of the tear-open aid. In particular, the end wall is stabilized, in a surface part adjacent to the extraction orifice, by the label projection extending over the length of the end wall.

Further features of the invention relate to the production process for the pack and the tear-open aid, to the design of the apparatus and to the pack itself.

Exemplary embodiments of the production of the adhesive strips or adhesive labels, of the apparatus and of the pack are explained in detail below by means of the drawings. In these:

DESCRIPTION OF THE PREFERRED EMBODIMENTS OF THE INVENTION

Figure 1:
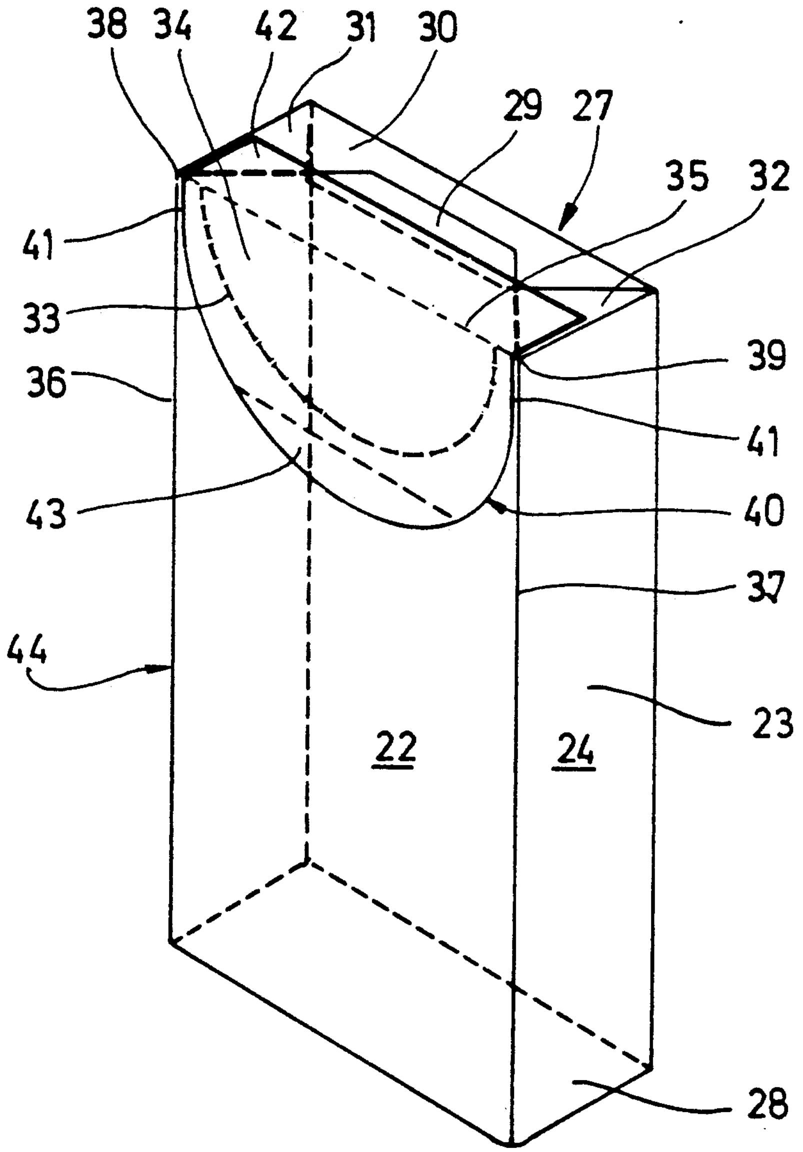
FIG. 1 shows a perspective representation of a film pack for paper handkerchiefs with a tear open aid.

FIG. 1 illustrates a pack which can consist of very thin film (for example, 30 ). The pack is suitable especially for receiving a stack of folded paper handkerchiefs.

Figure 2:
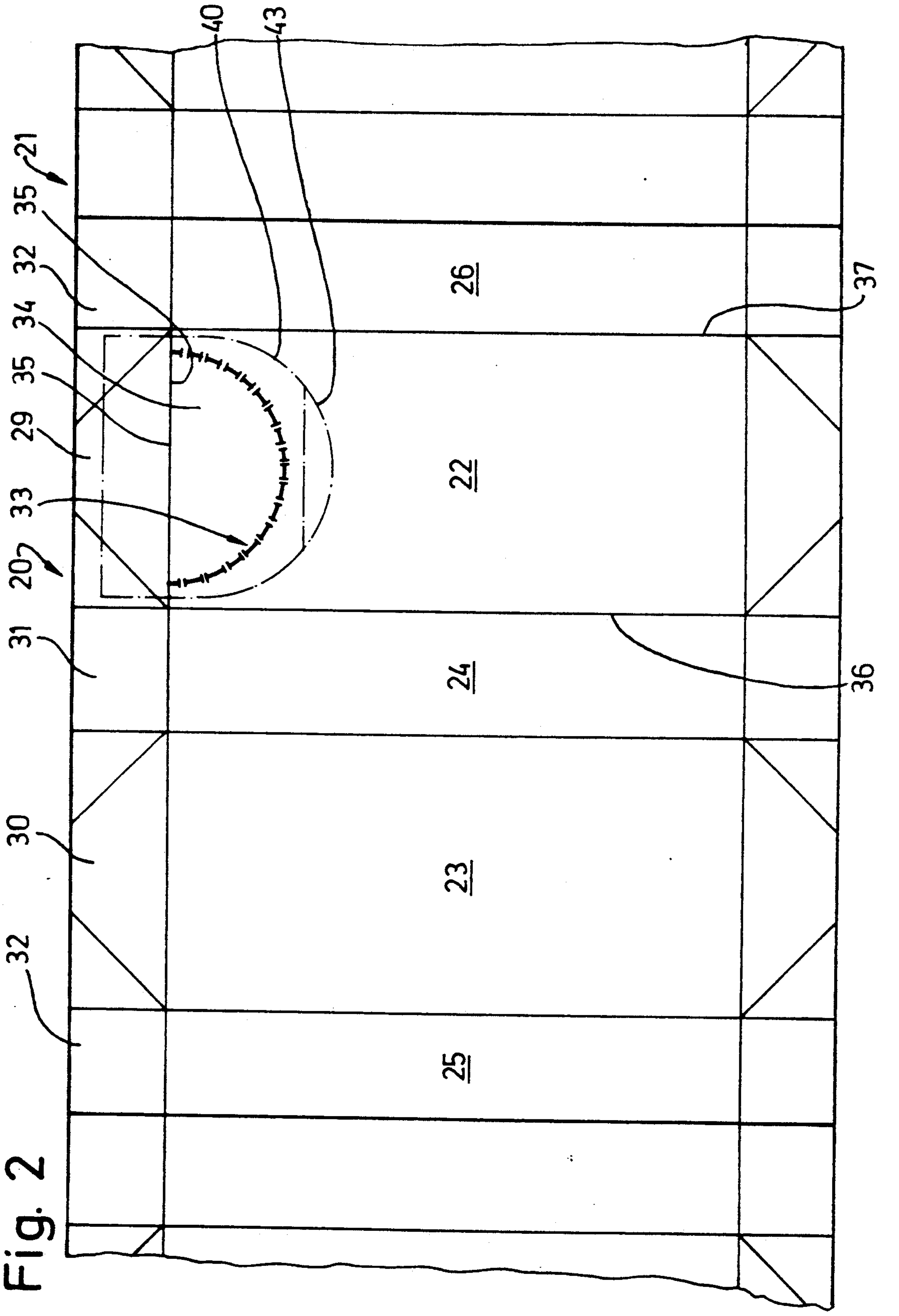
FIG. 2 shows a portion of a film web for the formation of blanks for a pack according to FIG. 1.

The pack is made from a rectangular blank 20 which is shown in FIG. 2 as a portion of a continuous film web 21. The blank 20 is intended for the formation of a front wall 22, a rear wall 23, a side wall 24 arranged between these and mutually overlapping side-wall tabs 25, 26 connected to one another via seals. Folding tabs for forming an upper end wall 27 and a corresponding bottom wall 28 adjoin the free sides of the above-mentioned pack walls. The respective folding tabs are outer and inner longitudinal tabs 29, 30 and side tabs 31, 32. In the exemplary embodiment of FIG. 1, the end wall 27, and correspondingly the bottom wall 28, is designed so that first the side tabs 31, 32 and then the longitudinal tabs 30 and 29 are folded inwards against the pack content, these latter acquiring a trapezoidal shape.

The pack is equipped with a tear-open aid in the region of the front wall 22. A perforation line 33, arcuate in the present case, limits a tear-open tab 34 which is formed in a region of the front wall 22 facing the end wall 27. The perforation line 33 extends as far as an edge formed between the front wall 22 and end wall 27 namely a front edge 35. This is at the same time a pivot axis for the tear-open tab 34 during opening and closing movements of the latter. The perforation lines 33 terminate at a distance from front vertical side edges 36, 37 and at the same time at a distance from the front corners 38, 39 formed between the front wall 22 and end wall 27.

The tear-open tab 34 is actuated by means of an externally attached adhesive label 40 which preferably consists of a somewhat thicker film with a coating of a permanent adhesive applied on one side.

In the exemplary embodiment of FIGS. 1 and 2, the adhesive label 40 is designed, dimensioned and arranged in a special way. As is evident, the adhesive label 40 has larger dimensions in the longitudinal and transverse directions than the tear-open tab 34. The adhesive label 40, likewise arcuate in the lower region here, extends in the region of the front wall 22, by means of a straight limiting edge 41 adjoining the arcuate contour, (approximately) as far as the side edges 36, 37 of the front wall 22. This is therefore covered by the adhesive label 40 over virtually the entire width in a region facing the end wall 27.

A connecting piece 42 of the adhesive label 40 extends over the same width, that is to say in rectangular form, in the plane of the end wall 27 and is connected to this by adhesive bonding. The dimensions of the connecting piece 42 are such that it covers approximately half the surface of the end wall 27 on the outside and extends in the region of the outer longitudinal tab 29 and of the side tabs 31, 32. The region of the tear-open tab and especially the loaded region of the end wall 27 are stabilized by means of the adhesive label 40 and especially its connecting piece 42. This remains in its position bonded adhesively to the end wall 27 even during the opening and closing movements.

In a lower region outside the tear-open tab 34, the adhesive label is equipped with an adhesive-free gripping end 43. This is formed by sticking a non-adhesive strip material on the side of the adhesive label 40 equipped with adhesive.

Figure 3:
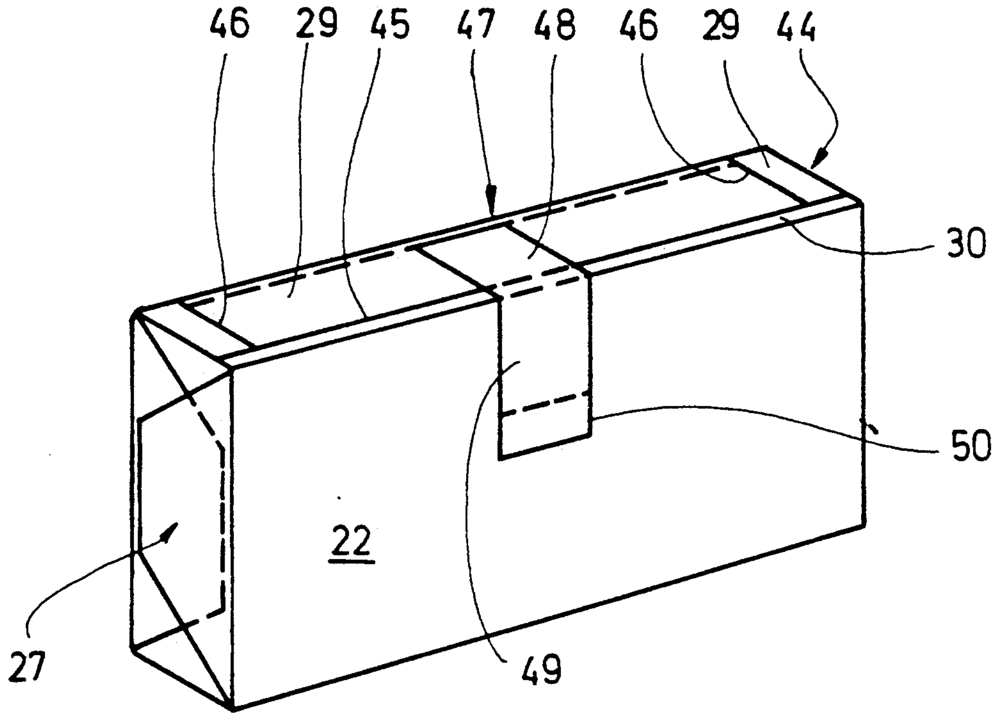
FIG. 3 shows another version of a film pack for paper handkerchiefs, likewise in a perspective representation.
Figure 4:
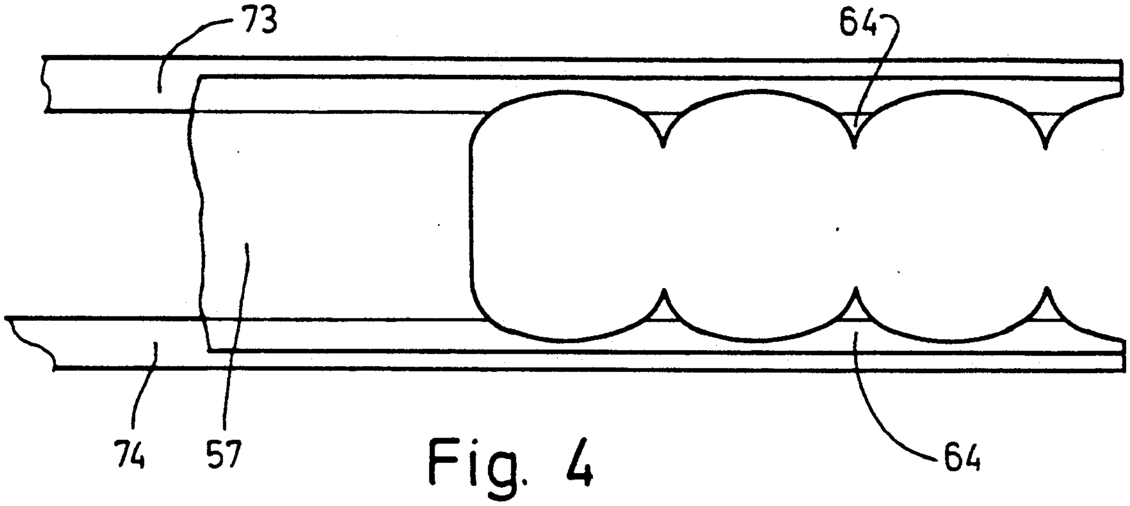
FIG. 4 shows a plan view of a web of material for the formation of adhesive labels (of double width)
Figure 5:
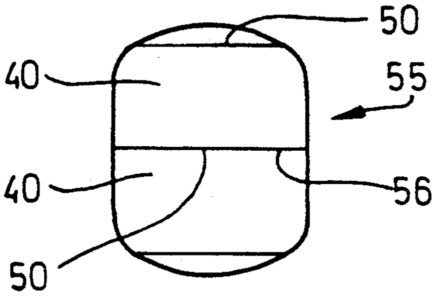
FIG. 5 shows an adhesive label of double width (double label)

In the version of a (film) pack shown in FIG. 3, the tear-open aid is attached in the region of a side wall 44 of the pack which is obtained by bonding the two longitudinal tabs 29, 30 together adhesively. The outer longitudinal tab 29 is at the same time an opening tab as part of the longitudinal tab 29 with a lateral limitation formed by means of severing cuts 46.

An elongate rectangular adhesive strip 47 consisting of a film with a one-sided adhesive coating extends, here, with one leg in the region of the side wall 44, at the same time being connected to the opening tab 45, and with a further leg in the region of the front wall 22. An adhesive-free gripping end 50 is formed at the free end of the adhesive strip 47 in the region of the front wall 22 in a similar way to the exemplary embodiment of FIGS. 1 and 2.

FIGS. 4 to 7 illustrate details of a process and of an apparatus which are especially suitable for the production of packs according to FIGS. 1 and 2, but also of other packs with a tear-open aid. As is evident, cuboid (film) packs 51 are conveyed in two parallel pack rows 52, 53 from a packaging machine, a store or the like. In the exemplary embodiment chosen here, the packs 21 of the two pack rows 52, 53 are pointed in the same direction as the production process. For the simultaneous attachment of adhesive labels 40 to two respective packs 51 adjacent to one another in pairs in the pack rows 52 and 53, the packs 51 of the one pack row, the pack row 53 in the exemplary embodiment shown, must be rotated through 180° so that the packs 51 of the two pack rows 52, 53 face one another with their end walls 27. The front walls 22 are directed upwards.

In such a relative position, the pack rows 52, 53 are conveyed, (continuously) into a label station 54. In this, adhesive labels of double width in each case, that is to say double labels 55, are simultaneously laid onto two respective mutually adjacent packs 51 of the pack rows 52, 53. For this purpose, the pack rows 52, 53 are arranged at such a distance from one another that the double label 55 can be attached to the two packs 51 in the correct position, in particular with the respective part assigned to the front wall 22 laid onto these. In an intermediate position, therefore, the double label 55 rests on the front walls 22 of the packs 51 adjacent to one another in pairs and connects these to one another. That part of the individual adhesive labels 40 (to be produced) which serves for forming the connecting piece 42 is exposed as a joining bridge between the two packs 51.

During the further transport of the pairs of packs 51, the double labels 51 are severed in the midplane between the two packs 51 by means of a severing cut 56 (FIG. 5), thereby forming two separate adhesive labels 40.

Those regions of the adhesive labels 40 projecting beyond the front wall 22 at the front edge 35, particularly the connecting pieces 42 of these, are then folded round into the vertical plane of the end wall 27 and adhesively bonded to this. Two packs 51 of the type according to FIG. 1 at a time are thus produced simultaneously.

The double labels 55 are severed, in the region of the label station 54, from a web of material 57 of corresponding dimensions, that is to say of at least double width, and consisting of film material. The web of material 57 equipped with an adhesive on one side is wound to form a reel 58. The web of material 57 is drawn off continuously from this in an ongoing manner and is conveyed via deflecting rollers 59, 60 up to the circumference of a transfer roller 61. This is arranged with its outer surface immediately above the packs 51 or pack rows 52, 53, in such a way that adhesive labels 40 or adhesive strips 47 and double labels 55 formed on the outer surface of the transfer roller 61 are transferred onto the upwardly directed side of the packs 51, specifically during the transport movement of these.

Individual adhesive labels 40, adhesive strips 47 or double labels 55 are made by punching from the web of material 57 in the region of the transfer roller 61. For this purpose, the transfer roller 61 is assigned a cutting roller 62. This is equipped on the circumference with projecting knives 63 which are arranged in a contour corresponding to the adhesive labels, adhesive strips or double labels to be produced. By means of the cutting roller 62, individual adhesive labels 40 or adhesive strips 47, in pairs, or double labels 55 can be produced, especially as a result of the bearing of the cutting roller 62 or the knives 63 against the outer surface of the transfer roller 61 or against the web of material 57 running off on this.

Figure 6:
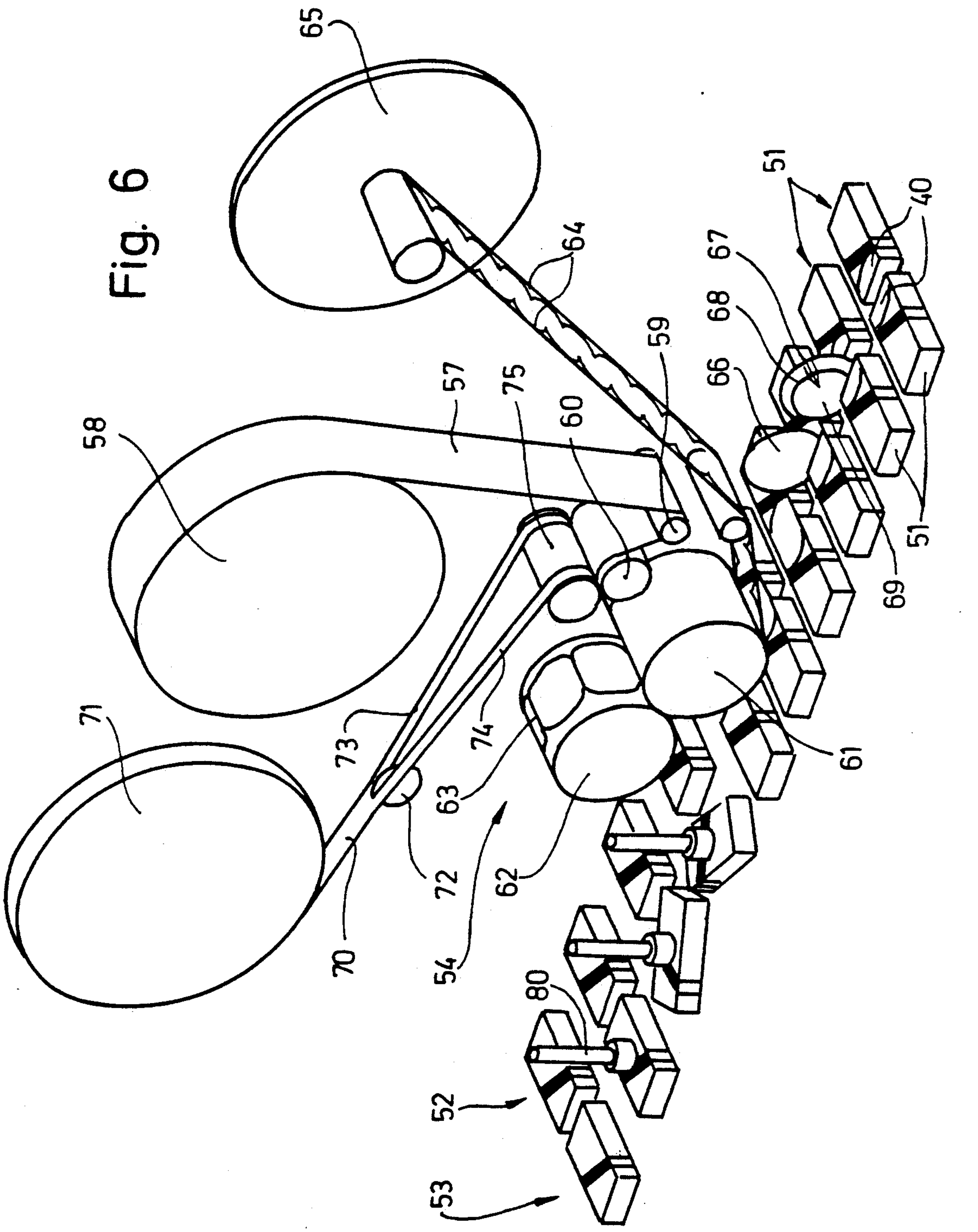
FIG. 6 shows a simplified perspective representation of details of an apparatus for the production and attachment of (double labels)
Figure 7:
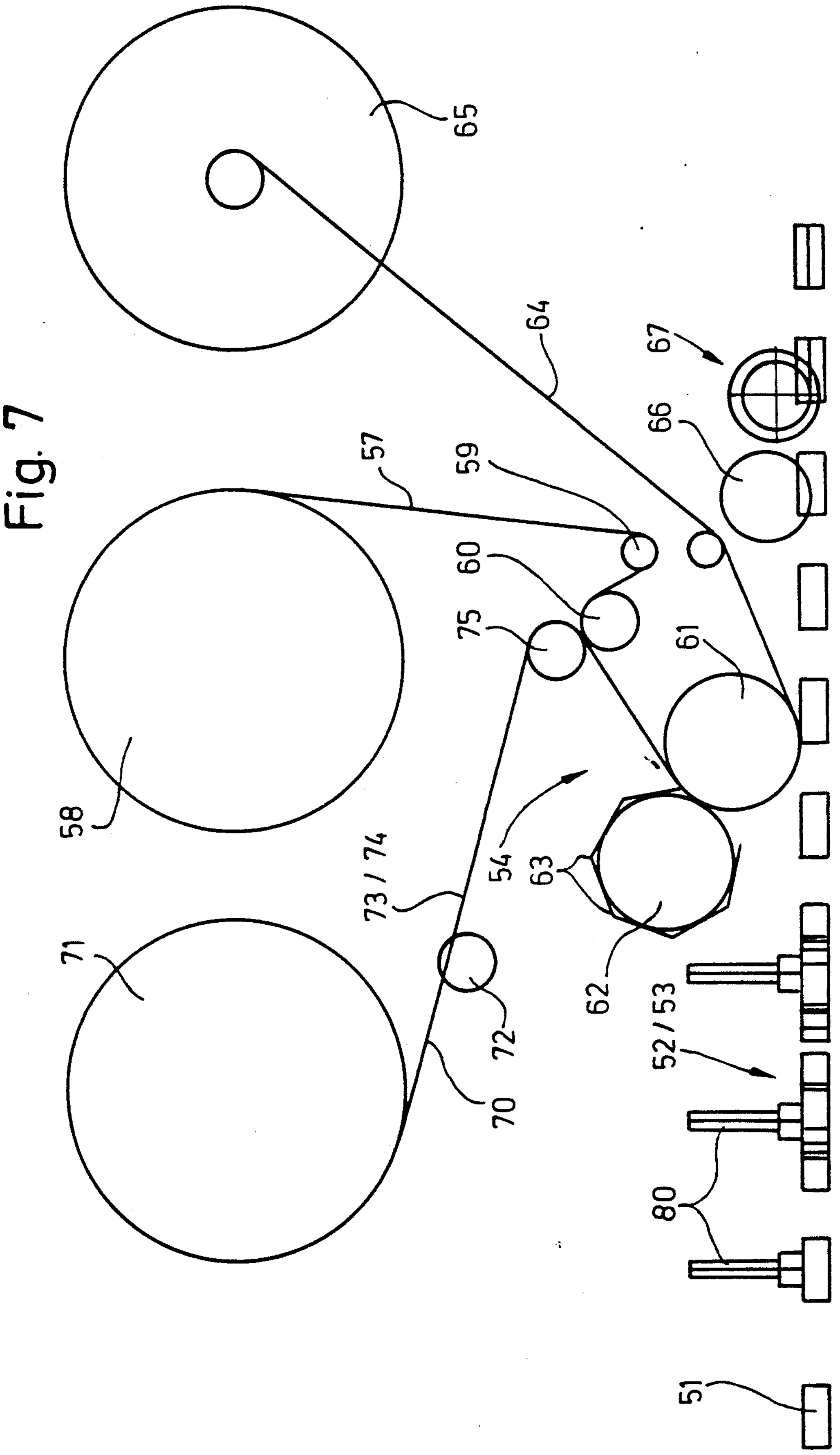
FIG. 7 shows a diagrammatic side view of the details of the apparatus according to FIG. 6.
Figure 8:
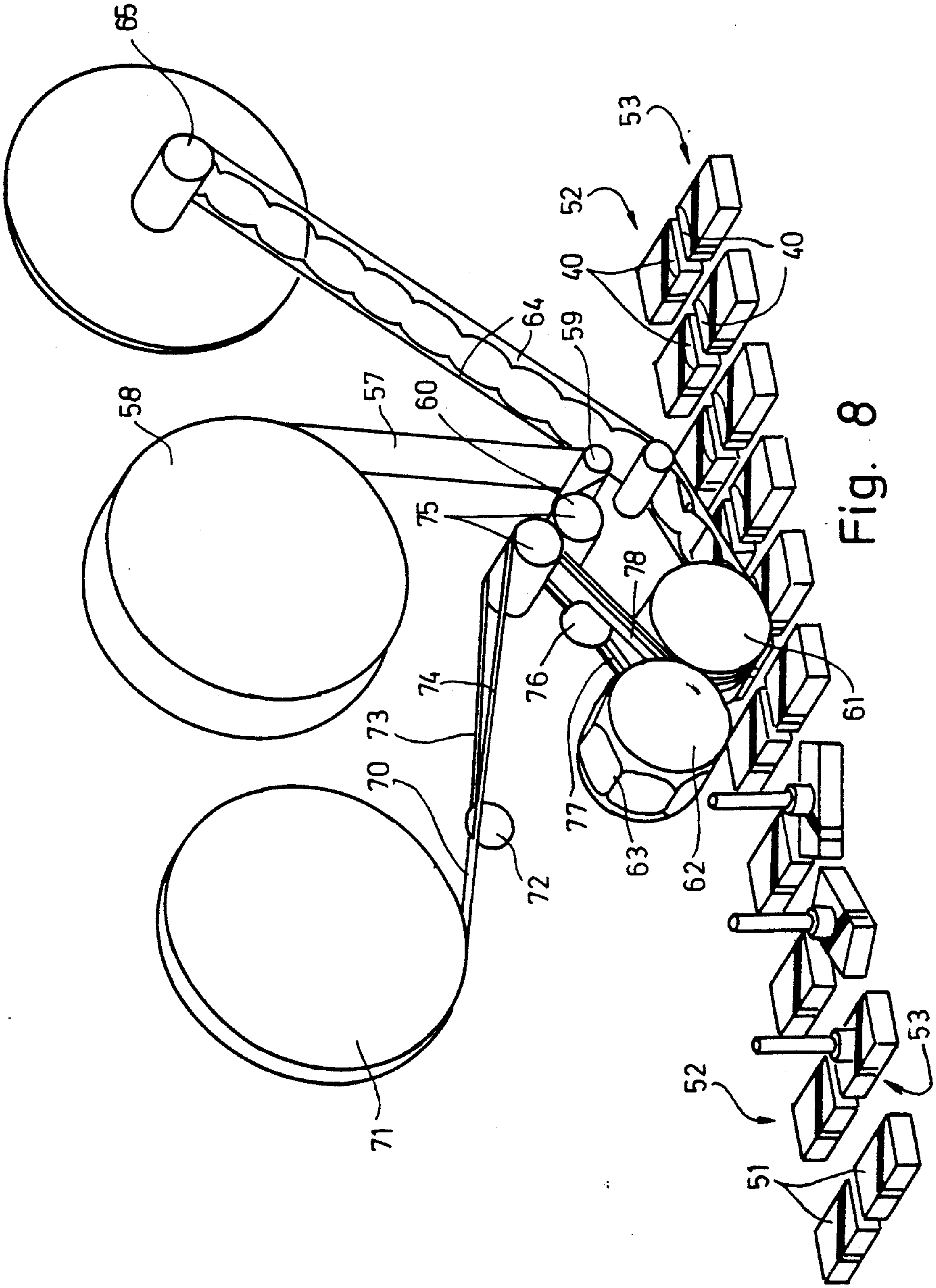
FIG. 8 shows a perspective representation of details of an apparatus and of a process, modified in relation to the exemplary embodiment of FIG. 6, for the production and attachment of adhesive labels on packs.

In the preferred exemplary embodiment according to FIGS. 6, 7 and 8, double labels 55 are punched respectively out of the web of material 57. The width of the web of material 57 is selected so that lateral waste strips 64 remain behind as a residue on the transfer roller 61. In the apparatus illustrated, these waste strips 64 are collected by being wound on to a waste reel 65 and thus eliminated without impairing the production operation.

The double labels 55 are laid successively and continuously on to the packs of the pack rows 52, 53 supplied in pairs. These are arranged with their end walls 27 facing one another and at such a distance from one another that the above-described attachment of the double label 55 to the top side of the two packs 51 is guaranteed.

The attachment of the double label 55 to the two packs 51 is followed by the severing cut 56 in the middle of the double label 55 between the two packs 51, specifically by means of a rotating disk-shaped severing knife 66 of fixed location.

The packs 51 are thereafter conveyed further uninterruptedly, with the relative position being maintained in the exemplary embodiment shown. The connecting pieces 42, projecting beyond the front wall 22 of the packs 51, of the adhesive labels 40 formed after the severing cut are jointly folded round downwards into the plane of the end wall 27. For this purpose, in the path of movement of the pack rows 52, 53 and between these there is a folding member of fixed location. In the exemplary embodiment illustrated, this is designed as a rotating folding disk 67. The design of the folding disk 67 is matched to the folding operation, in particular is double-conical. Obliquely directed folding surfaces 68 arranged on both sides pick up the projection, namely the connecting piece 42, and move it downwards, until a plane flat part 69 of the folding disk 67 presses the folded-round connecting piece 42 against the end wall 27 as a result of the relative position. The packs 51 are now also finished in terms of the tear-open aid.

The gripping end 43 attached to the adhesive labels 40 is made from a material strip 70 of paper, film or the like and is attached to the adhesive side of the adhesive label 40. The material strip 70 is drawn off continuously from a material roll 71. In the present exemplary embodiment, the material strip 70 is of double width and is severed centrally during transport, specifically by a cutting knife 72. The two part strips 73, 74 so obtained are conveyed at a distance from one another, specifically by bearing on the circumference of a deflecting roller 75. The distance formed is adjusted to the desired relative position of the part strips 73, 74 on the web of material 57. The part strips 73, 74 are pressed continuously against the web of material 57 on the edge of the latter, specifically on the side equipped with adhesive. The part strips 73, 74 are thus connected firmly to the edge regions of the web of material 57. The relative position of the part strips 73, 74 is such that, during the punching or cutting of the adhesive labels 40 or double labels 55, the gripping ends 50 are formed at the intended end or edge of the adhesive labels 40. Material waste obtained during the punching operation in the region of the part strips 73, 74 is conveyed away together with the waste strip 64.

A modification of the above-described process and of the apparatus can be taken from FIG. 8. Here, the double labels 55 described are not cut or punched out of the web of material 57, but this apparatus is designed for producing individual adhesive labels 40 and for attaching these in pairs to two respective packs 51. For this purpose, the web of material 57 equipped with the part strips 73, 74 is divided in the longitudinal centre during continuous transport, specifically by a disk-shaped cutting knife 76, in front of the cutting or stamping station, that is to say before the transfer roller 61 and the cutting roller 62 are reached. The part webs 77, 78 so obtained are guided at a distance from one another to the circumference of the transfer roller 61. In this exemplary embodiment, the knives 63 of the cutting roller 62 bearing on the transfer roller 61 are so designed that individual adhesive labels 40 arranged at a distance from one another are obtained on the circumference of the transfer roller 61 in the region of each part web 77, 78.

These adhesive labels 40 are then transferred on to the top side of the packs 51 in the way described, in such a way that a projection of the adhesive labels, namely the connecting piece 42, projects beyond the packs. During the further transport of the packs 51, these connecting pieces 42 are folded round against the end wall 27, specifically either by a folding member (folding disk 67) corresponding to the exemplary embodiment of FIG. 6 or by stationary cam-shaped folding members.

Figure 9:
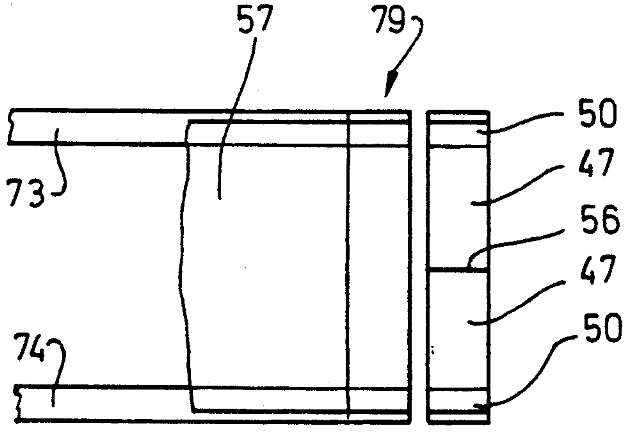
FIG. 9 shows a web of material for the production of adhesive strips of double width (double strips)
Figure 10:
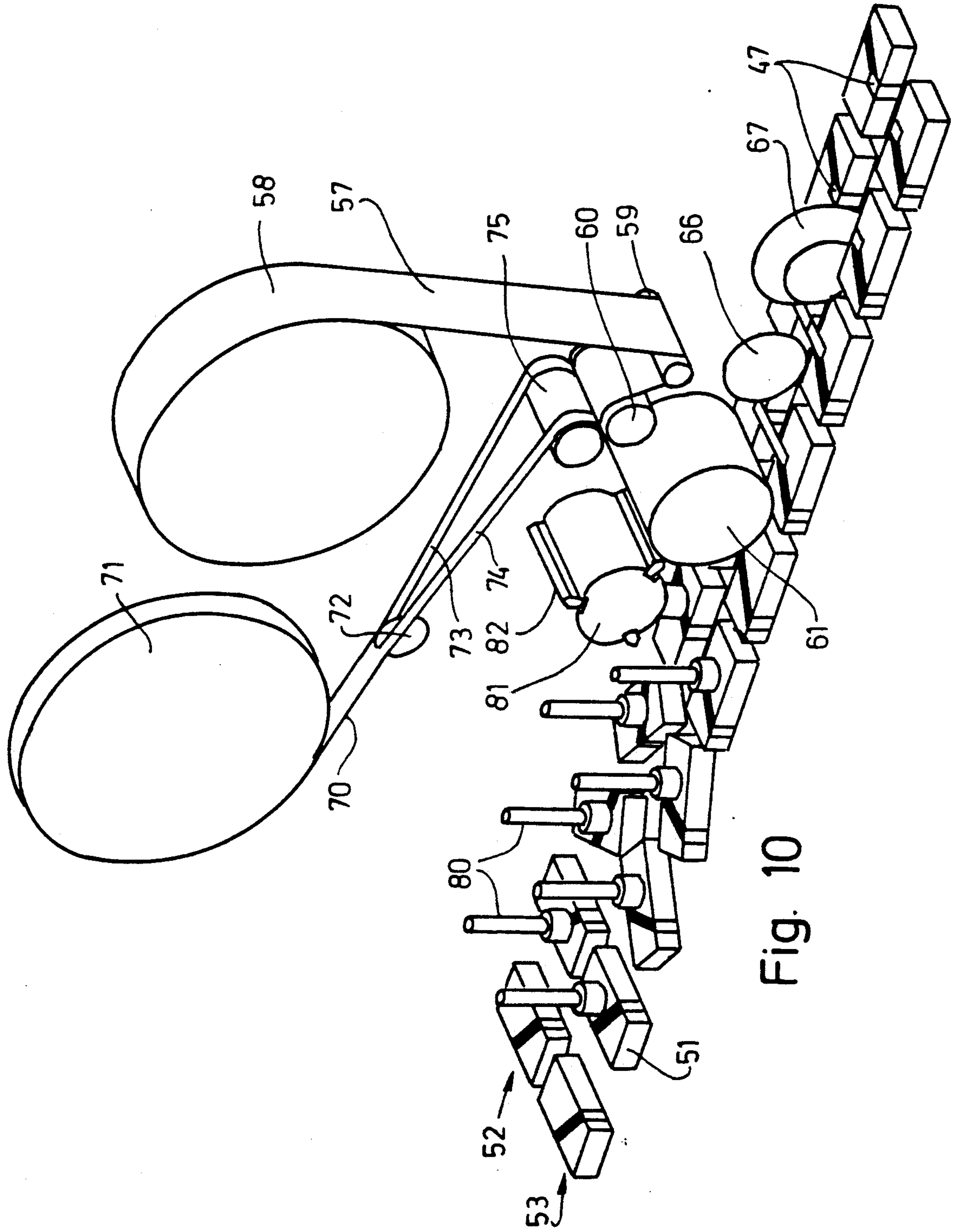
FIG. 10 shows a perspective representation of an apparatus for the production and attachment of adhesive strips of double width on packs.

The above-described process and apparatuses are also suitable in a similar way for the production and attachment of adhesive strips 47 conventional on many packs (FIGS. 9 and 10). The process and apparatus for producing and attaching adhesive strips 47 of this type are designed in a similar way to the exemplary embodiments already described. Like parts of the apparatus are therefore designated in FIG. 10 by the reference numerals of the preceding exemplary embodiments.

According to the exemplary embodiments described, the adhesive strips 47 can be produced in double width by being severed from the web of material 57, thereby forming adhesive strips of double length, double strips 79, or in pairs as individual adhesive strips 47. As shown in FIG. 9, in the production of double strips 79 these are laid onto packs supplied in pairs and are then severed centrally, in the present case by the severing knife 66. This results in a projecting leg 48 of the adhesive strips 47, which is folded round downwards here, in the way likewise already described, by a folding member designed as a folding disk 67. The exemplary embodiment of FIG. 10 shows the production of packs according to FIG. 3, in which the tear-open strip is held by means of the leg 49 in the region of the front wall 42 and by means of the leg 48 in the region of the elongate side wall 44.

For this purpose, the packs 51 are conveyed, with their longitudinal axes pointing in the conveying direction, in two parallel pack rows 52, 53. Because of the differing relative position during the feed of the packs 51, these are rotated through 90° in the two pack rows 52, 53, so that the side walls face one another. Here, as in the exemplary embodiments described too, the rotation of the packs 51 is brought about by means of rotary pistons 80 which can be subjected to suction air and which are arranged above the pack rows 52 and 53 and are driven rotatably.

Because of the small width of the adhesive strips 47 or double strips 79, a cutting roller 81 is designed differently from the cutting roller 62 of the exemplary embodiments described, in particular with a plurality of cutting knives 82 arranged at equal intervals along the circumference and directed in an axis-parallel manner. A double strip 79 (or two individual adhesive strips 47) at a time is severed from the web of material 57 by these as a result of their bearing on the transfer roller 61.

What is claimed is:

1. A process for the production of film packs for paper handkerchiefs, wherein each pack is provided with a tear-open tab having an individual adhesive tape resting on an outside surface of the pack, said process comprising the steps of:
   - severing a double-width adhesive tape (55) from a longitudinally extending web (57) of tape material which has on one side thereof an adhesive coating and which has a transverse width corresponding at least to a dimension of two individual adhesive tapes (40) lying next to each other;
   - applying the double-width adhesive tape simultaneously to respective opening tabs on corresponding sides of two adjacent ones of the packs so that said adhesive coating bonds to the opening tabs; and
   - then cutting the double-width tape (55) along a center line thereof between the two adjacent packs to produce two packs each of which has an individual adhesive tape (40) bonded thereto.

2. The process according to claim 1, further comprising the step of continuously conveying both said two adjacent packs and also said double-width tapes to a taping station where said double-width tapes are applied and bonded to said packs, said adjacent packs being conveyed in two adjacent pack rows.

3. The process according to claim 2, further comprising the step of, after said cutting step, folding outwardly extending projections of each individual tape around an adjoining end wall of a pack and bonding said projections to said end wall.

4. The process according to claim 2, further comprising the step, prior to said cutting step and in order to form an adhesive-free gripping end (43) on the individual adhesive tapes (40), of applying non-adhesive covering strips (73, 74) to opposite transverse edges of said web (57) on the side thereof having said adhesive coating, whereby said covering strips are also cut during said cutting step.

5. The process according to claim 4, wherein the width of said double-width tapes (55) is smaller than the transverse width of said web (57), and further comprising the steps of punching out of said web (57) the double-width tapes together with their gripping ends, and winding the resulting residual lateral waste strips (64) of the web onto a reel (65).

6. The process according to claim 4, further comprising the steps, in order to form each of the gripping ends (43), of centrally cutting said covering strips (73, 74) from a web (70) of double-width, and
   - subsequently guiding said covering strips in a divergent manner into a relative position necessary for attachment to said opposite transverse edges.

7. The process according to claim 2, further comprising the step of rotating the packs of one pack row through 180° so that adjacent packs in the two pack rows have end walls (27) thereof facing one another.

8. The process according to claim 2, further comprising the step, for attaching adhesive tapes in the region of a front wall (22) and a side wall (44) of a pack, of rotating the packs in the two pack rows respectively through 90° so that the packs in the two rows have side walls (44) of the packs facing one another.

9. Apparatus for the production of adhesive tapes and the attachment thereof to film packs, comprising:
   - a taping station (54) where adhesive tapes are attached to film packs;
   - first feeding means for feeding two adjacent rows of the film packs to said tape station;
   - a supply of a web (57) of adhesive tape material which has a width equal to at least double that of two individual adhesive tapes (40) and which has on one side thereof an adhesive coating;
   - second feeding means for feeding said web (57) to said taping station;
   - severing means for severing from said web (57) a double-width tape (55);
   - means for applying said one side of the double-width tape simultaneously to corresponding sides of two adjacent packs (51) in said adjacent rows (52, 53); and
   - cutting means for cutting the applied double-width tape (55) along a center line thereof between the two adjacent packs to produce two packs each of which has an individual adhesive tape (40) bonded thereto.

10. The apparatus according to claim 9, wherein said severing means comprises a cutting roller (62, 81), wherein said applying means comprises a transfer roller, and wherein said cutting means comprises a severing knife (66) located on said center line between two adjacent packs.

11. The apparatus according to claim 9, further comprising:
   - a supply of adhesive-free material in the form of an elongated strip (70) having a double width;
   - means for severing said elongated strip along a longitudinal center line thereof into two part strips (73, 74); and
   - means for feeding and applying said part strips to outer transverse edges of the web (57) on the side thereof having the adhesive coating, thereby forming adhesive-free gripping ends (43) on the individual adhesive tapes (40).

12. The apparatus according to claim 9, wherein the width of the double-width tapes (55) is smaller than the transverse width of the web (57), and further comprising:

means for punching said double-width tapes (55) out of the web (57); and waste reel means (65) for winding up the resulting residual lateral waste strips (64) of the web.

13. The apparatus according to claim 9, further comprising folding means (67), disposed downstream of said cutting means and located in a region between the pack rows (52, 53), for folding outwardly projecting portions of each individual tape (40) over and against an adjoining end wall of each pack and for bonding said portions to said end wall.

* * * * *